United States Patent
Lawrenson et al.

(10) Patent No.: US 11,436,380 B2
(45) Date of Patent: Sep. 6, 2022

(54) SENSOR PRIVACY SETTING CONTROL

(71) Applicant: KONINKLIJKE PHILIPS N.V., Eindhoven (NL)

(72) Inventors: Matthew John Lawrenson, Bussigny-pres-de-lausanne (CH); Lucas Jacobus Franciscus Geurts, Best (NL); Vincentius Paulus Buil, Veldhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 523 days.

(21) Appl. No.: 16/305,294

(22) PCT Filed: May 30, 2017

(86) PCT No.: PCT/EP2017/062979
§ 371 (c)(1),
(2) Date: Nov. 28, 2018

(87) PCT Pub. No.: WO2017/211614
PCT Pub. Date: Dec. 14, 2017

(65) Prior Publication Data
US 2020/0334386 A1    Oct. 22, 2020

(30) Foreign Application Priority Data

Jun. 7, 2016 (EP) .................... 16173395

(51) Int. Cl.
*G06F 21/00* (2013.01)
*G06F 21/83* (2013.01)
(Continued)

(52) U.S. Cl.
CPC .......... *G06F 21/83* (2013.01); *G06F 21/6245* (2013.01); *G06V 40/103* (2022.01); *G06V 40/20* (2022.01)

(58) Field of Classification Search
None
See application file for complete search history.

(56) References Cited

U.S. PATENT DOCUMENTS

2006/0064384 A1   3/2006  Mehrotra et al.
2015/0213702 A1   7/2015  Kimmel
(Continued)

FOREIGN PATENT DOCUMENTS

EP    2390820 A2     11/2011
JP    2006238110 A    9/2006
(Continued)

OTHER PUBLICATIONS

Winkler, Thomas; Rinner, Bernhard. TrustCAM: Security and Privacy-Protection for an Embedded Smart Camera Based on Trusted Computing. 2010 7th IEEE International Conference on Advanced Video and Signal Based Surveillance, https://ieeexplore.ieee.org/stamp/stamp.jsp?tp=&arnumber=5597078 (Year: 2010).*
(Continued)

*Primary Examiner* — Jeremiah L Avery (57) ABSTRACT

There is provided a method and apparatus for controlling a privacy setting of at least one sensor. A signal is acquired from one or more sensors. A characteristic of one or more subjects is detected in the acquired signal. A privacy level is set based on the detected characteristic of the one or more subjects. A privacy setting of at least one sensor is controlled based on the set privacy level.

20 Claims, 3 Drawing Sheets (51) Int. Cl.
  *G06F 21/62* (2013.01)
  *G06V 40/20* (2022.01)
  *G06V 40/10* (2022.01)

(56) References Cited

U.S. PATENT DOCUMENTS

| | | | |
|---|---|---|---|
| 2015/0242638 A1* | 8/2015 | Bitran ................ | G06F 21/6245 726/26 |
| 2015/0296170 A1* | 10/2015 | Farrell ................ | G06V 30/194 386/254 |
| 2016/0027278 A1 | 1/2016 | McIntosh et al. | |
| 2016/0063893 A1 | 3/2016 | Kanuganti | |
| 2017/0024885 A1* | 1/2017 | Miyazaki ............... | A45D 44/00 |
| 2017/0255786 A1* | 9/2017 | Krishnamurthi ........ | G06F 3/013 |
| 2018/0160020 A1* | 6/2018 | Djakovic ............... | H04N 7/181 |
| 2020/0334386 A1* | 10/2020 | Lawrenson ......... | G06F 21/6245 |

FOREIGN PATENT DOCUMENTS

| JP | 2014154918 A | 8/2014 |
|---|---|---|
| JP | 2014182793 A | 9/2014 |

OTHER PUBLICATIONS

Pittaluga, Francesco; Koppal, Sanjeev J. Privacy preserving optics for miniature vision sensors. 2015 IEEE Conference on Computer Vision and Pattern Recognition (CVPR). https://ieeexplore.ieee.org/stamp/stamp.jsp?tp=&arnumber=5597078 (Year: 2015).*

MyFox Security Camera, Accessed Nov. 28, 2018, http://www.getmyfox.com/us_en/security-camera.html.

Chen, J. et al., "Bathroom Activity Monitoring Based on Sound", Pervasive Computing, Third International Conference, 2005.

Roy, D. et al., "The Human Speechome Project", P. Vogt et al. (Eds.): EELC 2006, LNAI 4211, pp. 192-196, 2006.

Jibo, https://www.jibo.com/, Accessed Nov. 28, 2018.

Achenbach, J., "Social robots: The solution to our screen addictions, or just more digital weirdness?", Dec. 2015, https://www.washingtonpost.com/news/speaking-of-science/wp/2015/12/28/social-robots-the-solution-to-our-screen-addiction-or-more-digital-weirdness/?noredirect=on&utm_temn=.fb5a7572087b.

Suzuki, Y. et al., "Measuring empathy for human and robot hand pain using electroencephalography", Scientific Reports, 2015.

Zolfagharifard, E. et al., "Could YOU fall in love with a robot? Study suggests we feel as much empathy for droids as we do for other people", dailymail.com, Dec. 2015.

Cluley, G., "The dirty secrets of webcam-hacking peeping toms and sextortionists", https://www.welivesecurity.com/2015/04/21/webcam-hacking/, 2015.

Fitzpatrick, J., "How to Disable Your Webcam (and Why You Should)", https://www.howtogeek.com/210921/how-to-disable-your-webcam-and-why-you-should/, Nov. 2016.

"Multispectral image", https://en.wikipedia.org/wiki/Multispectral_image, Last Edited Aug. 2018.

"Hyperspectral imaging", https://en.wikipedia.org/wiki/Hyperspectral_imaging, Last Edited Oct. 2018.

"Activity recognition", https://en.wikipedia.org/wiki/Activity_recognition, Nov. 2018.

"InstructMe—Human Activity Recognition in Industrial Applications", https://www.youtube.com/watch?v=PbbdrtM2nxQ, Apr. 2015.

Affectiva, https://www.affectiva.com/, Accessed Nov. 28, 2018.

Emotient, https://imotions.com/emotient/, Accessed Nov. 28, 2018.

NVISO, https://www.nviso-insights.com/en, Accessed Nov. 28, 2018.

* cited by examiner

SENSOR PRIVACY SETTING CONTROL

CROSS-REFERENCE TO PRIOR APPLICATIONS

This application is the U.S. National Phase application under 35 U.S.C. § 371 of International Application No. PCT/EP2017/062979, filed on 30 May 2017, which claims the benefit of European Patent Application No. 16173395.1, filed on 7 Jun. 2016. These applications are hereby incorporated by reference herein.

FIELD OF THE INVENTION

The invention relates to the field of privacy control and, in particular, relates to controlling a privacy setting of at least one sensor.

BACKGROUND OF THE INVENTION

There are many situations in which the monitoring of a subjects can be beneficial. For example, subjects are often monitored for health purposes. The monitoring of subjects can take place by a sensor at the home of the subject, a healthcare facility, or another location. Also, personal robots have recently begun to enter the market, providing a mixture of companionship and assistance to subjects. Thus, in the near future, interactions between humans and personal robots are likely to increase in private environments due to the benefits they offer.

While monitoring of a subject and the interaction with personal robots can provide useful benefits to a subject, the subject no longer has the same level of privacy. This may become particularly apparent for the subject when they need to undertake private activities. For example, there will be situations where a subject needs to be in a state of undress (such as in the bathroom as well as other locations) or where a subject needs to carry out actions that they would not be comfortable for others to see. Also, the monitoring of activities may involve the collection of privacy sensitive data, such as images of the body of a subject. This can cause a subject to feel uneasy. In the case of personal robots, this feeling of unease may be enhanced. For example, the subject may assign human traits to the robot and can have a personal bond with them.

Therefore, there is a need for robots to be configured to exhibit courtesy and behave respectfully when engaging with a subject, especially in certain settings such as the bathroom. There is also a need for resolving the privacy issues with sensors used for monitoring subjects. In particular, sensors can be hacked to obtain private data such as images or videos of a subject without their authorisation. This can cause subjects to unplug, shut down, or cover sensors, which can negatively impact their health as they can no longer be monitored.

Often a subject will be made aware that an image or a recording is being taken, for example, through visual clues (such as a red or blinking light) and acoustic clues (such as the clicking sound of a camera shutter) and they can then adapt accordingly to meet their privacy requirements. However, visual and acoustic clues can be remotely turned off without the subject being aware. Moreover, even when turned off, a camera lens might still cause a feeling of unease or embarrassment for the subject in case it is still possible that they are being monitored.

There exist sensors such as those used in security cameras that have a shutter controllable with a smartphone or automatically when people connect to their home Wi-Fi. A subject can decide when they wish to be monitored by closing or opening a motorised shutter with a tap from a smartphone to ensure privacy. However, controlled shutters have the drawback that activation can be easily forgotten until after an image is already recorded. There is also no correlation to the current activities of the subject or the attitude of the subject towards the recording. Furthermore, there is no option to optimise between the level of detail or specific data of the recorded image and privacy.

US 2016/0027278 A1 discloses a system for event-based monitoring of a subject, which reduces the level of data detail exposed to a monitoring subject. The system provides sufficient data detail to indicate whether the subject is safe without exceeding a level of detail comfortable to the subject. However, the subject is still not put at ease and their privacy concerns will remain since the subject will still be aware of the sensors used for monitoring and the fact that these sensors may be hacked. Also, there is no personalisation for the subject to set their privacy requirements. Thus, the system may still acquire data that the subject does not wish to disclose and may miss important data that the subject is actually comfortable to provide.

Therefore, there is a need for an improved method and apparatus for controlling a privacy setting of one or more sensors.

SUMMARY OF THE INVENTION

As noted above, a limitation with existing monitoring and interactive devices is that the privacy concerns of a subject are not fully addressed to optimise the data acquired from sensors while meeting the privacy requirements of the subject.

Therefore, according to a first aspect of the invention, there is provided a method for controlling a privacy setting of at least one sensor. The method comprises acquiring a signal from one or more sensors, detecting a characteristic of one or more subjects in the acquired signal, setting a privacy level based on the detected characteristic of the one or more subjects, and controlling a privacy setting of at least one sensor based on the set privacy level.

In some embodiments, the method may further comprise determining that a privacy sensitive situation is expected to occur based on the detected characteristic of the one or more subjects and, in response to the determination, the privacy level may be set based on the detected characteristic of the one or more subjects and the privacy setting of at least one sensor may be controlled based on the set privacy level.

In some embodiments, setting a privacy level based on the detected characteristic of the one or more subjects may comprise comparing the detected characteristic with predefined characteristics stored in a database, each predefined characteristic having an associated privacy level, selecting the predefined characteristic that most closely matches the detected characteristic, and setting the privacy level to the privacy level associated with the selected predefined characteristic.

In some embodiments, a privacy level stored in the database may be associated with a predefined characteristic based on one or more of: previous signals acquired from the one or more sensors and an input received from the one or more subjects.

In some embodiments, the method may further comprise identifying at least one of the one or more subjects in the acquired signal and determining a required privacy level for one or more of the at least one identified subjects for the detected characteristic, wherein setting the privacy level based on the detected characteristic of the one or more subjects may comprise setting the privacy level based on the determined required privacy level for the one or more of the at least one identified subjects.

In some embodiments, the method may further comprise receiving an input from at least one of the one or more subjects indicative of a required privacy level for the detected characteristic and determining whether to adjust the set privacy level based on the received input.

In some embodiments, the method may further comprise detecting a change in the characteristic of at least one of the one or more subjects in the acquired signal and determining whether to adjust the set privacy level to an alternative privacy level based on the detected change in the characteristic of the at least one of the one or more subjects.

In some embodiments, the characteristic of the one or more subjects may comprise one or more of: a characteristic indicative of an activity of the one or more subjects, a characteristic indicative of a level of nakedness of the one or more subjects, a characteristic indicative of an emotion of the one or more subjects, a characteristic indicative of a behaviour of the one or more subjects, a characteristic indicative of a status of a device for use by the one or more subjects, and a physiological characteristic of the one or more subjects.

In some embodiments, controlling a privacy setting of at least one sensor based on the set privacy level may comprise one or more of: switching on or off at least one sensor based on the set privacy level, moving at least one sensor with respect to the one or more subjects based on the set privacy level, changing a signal acquisition capability of at least one sensor based on the set privacy level, at least partially blocking, obscuring or altering the signal acquired from at least one sensor based on the set privacy level, and controlling a component to modify the environment of the one or more subjects.

In some embodiments, the method may further comprise acquiring a controlled signal from the at least one sensor with the controlled privacy setting.

In some embodiments, the method may further comprise rendering the controlled signal to the one or more subjects.

According to a second aspect of the invention, there is provided a computer program product comprising a computer readable medium, the computer readable medium having computer readable code embodied therein, the computer readable code being configured such that, on execution by a suitable computer or processor, the computer or processor is caused to perform the method or the methods described above.

According to a third aspect of the invention, there is provided an apparatus for controlling a privacy setting of at least one sensor. The apparatus comprises a control unit configured to acquire a signal from one or more sensors, detect a characteristic of one or more subjects in the acquired signal, set a privacy level based on the detected characteristic of the one or more subjects, and control a privacy setting of at least one sensor based on the set privacy level.

In some embodiments, the control unit may be further configured to determine that a privacy sensitive situation is expected to occur based on the detected characteristic of the one or more subjects and, in response to the determination, the privacy level may be set based on the detected characteristic of the one or more subjects and the privacy setting of at least one sensor may be controlled based on the set privacy level.

In some embodiments, the control unit may be configured to control one or more user interface components to render the controlled signal.

In some embodiments, the apparatus may comprise at least one of the one or more of the sensors.

In some embodiments, the one or more sensors may comprise one or more of: a visual sensor, an acoustic sensor, a physiological sensor, an inertial sensor, a motion sensor, a device activation sensor, and a lock activation sensor.

According to the above aspects and embodiments, the privacy requirements of subjects can be determined and privacy settings can be adapted to achieve the privacy requirements. It is possible to determine the privacy settings to apply a limit to sensor data collecting capabilities in accordance with the wishes of subjects in such a way that relevant data is still acquired whilst the privacy concerns of the subjects are relieved.

There is thus provided an improved method and apparatus for controlling a privacy setting of at least one sensor, which overcomes the existing problems with privacy.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

As noted above, the invention provides an improved method and apparatus for controlling a privacy setting of at least one sensor, which overcomes the existing problems with privacy.

Figure 1:
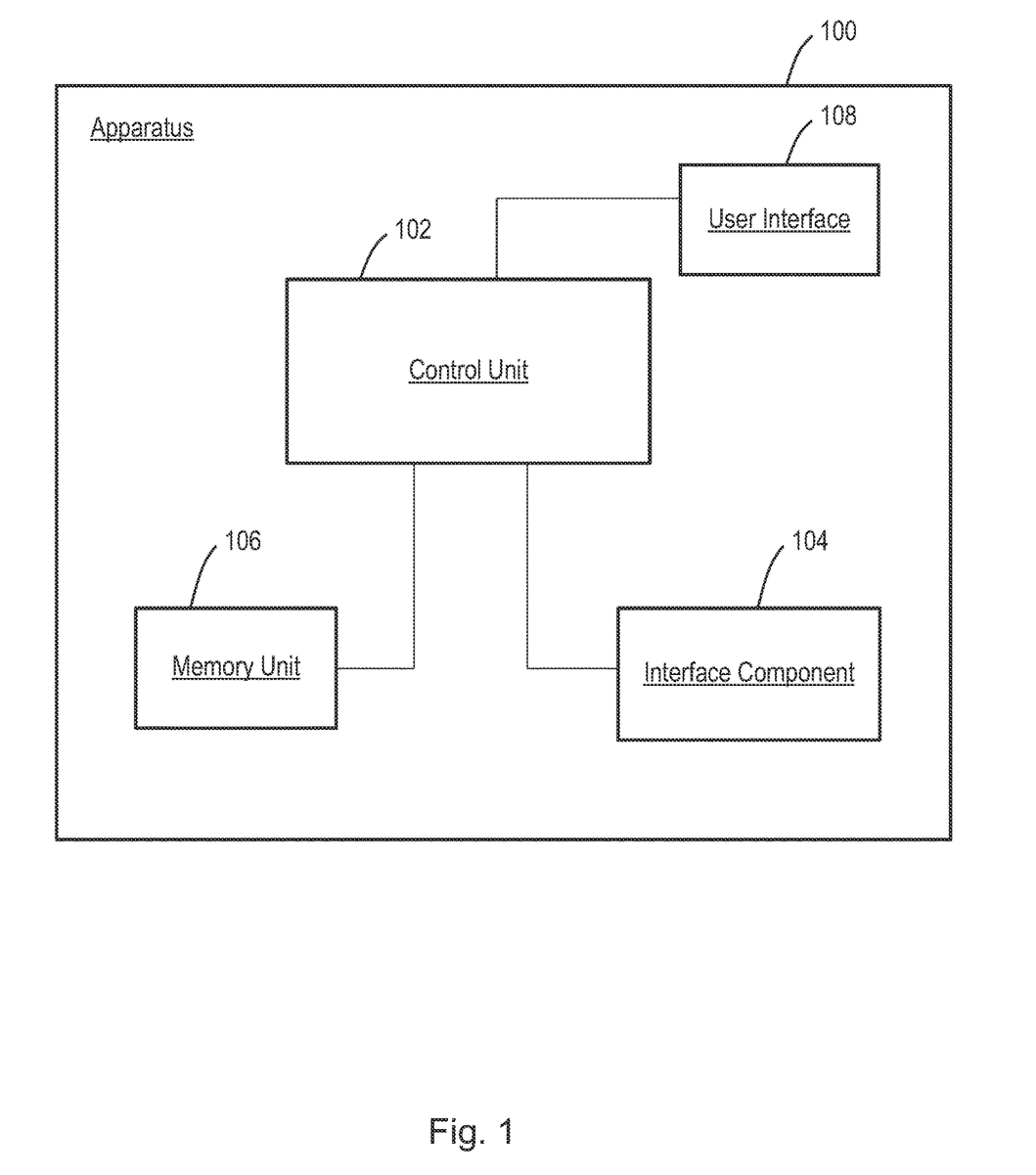
FIG. 1 is a block diagram of an apparatus according to an embodiment.

FIG. 1 shows a block diagram of an apparatus 100 according to an embodiment of the invention that can be used for controlling a privacy setting of at least one sensor. The at least one sensor may be a single sensor or a set of sensors. The at least one sensor can be configured to acquire or collect sensor signals (or sensor data). The at least one sensor has privacy settings that can be set or adapted by the apparatus 100 to personalise and optimise the privacy offered to a subject.

The apparatus 100 comprises a control unit 102 that controls the operation of the apparatus 100 and that can implement the method describe herein. The control unit 102 can comprise one or more processors, processing units, multi-core processors or modules that are configured or programmed to control the apparatus 100 in the manner described herein. In particular implementations, the control unit 102 can comprise a plurality of software and/or hardware modules that are each configured to perform, or are for performing, individual or multiple steps of the method according to embodiments of the invention.

Briefly, the control unit 102 is configured to acquire a signal (e.g. an electrical signal) from one or more sensors, detect a characteristic of one or more subjects in the acquired signal, set a privacy level based on the detected characteristic of the one or more subjects and control a privacy setting of at least one sensor based on the set privacy level. In some embodiments, the at least one sensor for which a privacy setting is controlled may be at least one of the same sensor as the one or more sensors from which the signal is acquired. For example, a privacy setting of the one or more sensors from which the signal is acquired may be controlled. In some embodiments, the at least one sensor for which a privacy setting is controlled may be at least one different sensor to the one or more sensors from which the signal is acquired.

In some embodiments, the control unit 102 can be configured to control one or more sensors to acquire a signal. The apparatus 100 may comprise at least one of the one or more sensors. Alternatively or in addition, at least one of the one or more sensors may be external to (i.e. separate to or remote from) the apparatus 100. For example, a smartphone or connected device (such as a personal hygiene device or any other device) can comprise at least one of the one or more sensors.

In some embodiments, a device designed to be worn by a subject can comprise at least one of the one or more sensors. In other words, a wearable device can comprise at least one of the one or more sensors. A wearable device can be designed to be worn on or around the neck of the subject, the wrist of the subject, the waist of the subject, the back of the subject, the chest of the subject, or any other part of the subject. In the neck-worn embodiment, the device can be in the form of a pendant that is worn on a cord, chain, necklace, or collar around the neck of the subject. In the wrist-worn embodiment, the device may be provided in the form of a wrist band, a wrist strap or a watch. Although examples of the form that a wearable device may take have been provided, it will be appreciated that a wearable device is not limited to these forms and other forms of device are also possible.

In some embodiments, the apparatus 100 may comprise a communications interface component 104 for enabling the apparatus 100 to communicate with any sensors and devices that are internal or external to the apparatus 100 (such as the one or more sensors and one or more wearable devices or any other connected devices). The communications interface component 104 may communicate with any sensors and devices wirelessly or via a wired connection.

A sensor may be any type of sensor. For example, a sensor can comprise one or more of: a visual sensor (such as a camera, a video, an infra-red sensor, or any other visual sensor or combination of visual sensors), an acoustic sensor (such as a microphone or any other acoustic sensor), a vital signs or physiological sensor (such as a heart rate sensor, a blood pressure sensor, a skin conductivity sensor, a muscle activity sensor, a skin temperature sensor, a breathing rate sensor, or any other physiological sensor), an inertial, activity, or motion sensor (such as an accelerometer, a gyroscope, a magnetometer, a visual sensor, a pressure sensor, or any other inertial, activity or motion sensor), a device activation sensor, and a lock activation sensor.

A physiological (or vital signs) sensor may be any sensor suitable to acquire at least one physiological signal from a subject. For example, a physiological sensor can comprise one or more of a heart rate sensor (such as an electrocardiogram ECG sensor, a photoplethysmography PPG sensor, a phonocardiography PCG sensor, or any other heart rate sensor), a vibration detection sensor or an acoustic physiological sensor (such as such as microphone, a capacitive micromachined ultrasonic transducer CMUT sensor, an accelerometer, a strain gauge, a responsive material, or any other acoustic physiological sensor), a skin conductivity sensor, a muscle activity sensor (such as an electromyography EMG sensor), a temperature sensor (such as a skin temperature sensor), a respiratory rate sensor, and any other type of sensor suitable to acquire one or more physiological signals from a subject.

In some embodiments, one or more physiological sensors may be integrated into a wearable device. In these embodiments, the one or more physiological sensors can acquire physiological signals from a subject wearing the wearable device.

In some embodiments, a physiological sensor in the form of a heart rate sensor may be used to acquire physiological signals from a subject. In this embodiment, the physiological signals are heart rate signals. The heart rate sensor may be any type of heart rate sensor. In one example, the heart rate sensor is an electrocardiogram (ECG) sensor and the heart rate signal of the subject may be acquired from an ECG signal (i.e. a signal indicating the electrical activity of the heart) measured by the ECG sensor. An ECG signal is received from the subject when a wearable device comprising an ECG sensor is worn by the subject. The ECG sensor may comprise one or more electrodes.

In another example, the heart rate sensor is a photoplethysmography (PPG) sensor and the heart rate signal of the subject may be acquired from a PPG signal measured by the PPG sensor. A PPG signal is received from the subject when a wearable device comprising a PPG sensor is worn by the subject. The PPG sensor may comprise one or more light sources (such as LEDs) operating at specific frequencies and one or more light detectors (such as photo-diodes), which react to the light that is either reflected or transmitted when the PPG sensor is in contact with the skin of the subject.

In another example, the heart rate sensor is a phonocardiography (PCG) sensor and the heart rate signal of the subject may be acquired from a PCG signal measured by the PCG sensor. A PCG signal is received from the subject when a wearable device comprising a PCG sensor is worn by the subject. The PCG sensor may comprise one or more vibration transducers (or microphones), which detect acoustic signals when the PCG sensor is in contact with the skin of the subject. In these examples, the acoustic signals can be processed to identify sounds that occur due to the beating of the heart.

In other examples, the heart rate sensor can be an accelerometer. In these examples, an acceleration measurement signal can be processed to identify accelerations or movements due to the beating of the heart.

In some embodiments, a physiological sensor in the form of a skin conductivity sensor may be used to acquire physiological signals from a subject. In this embodiment, the physiological signals are skin conductivity signals (i.e. galvanic skin response signals). The skin conductivity sensor may be in the form of a pair of electrodes that are placed in a wearable device to contact with the skin of the subject. An electrical current may be applied through one of the electrodes and the resistance of the skin measured, or the voltage between the electrodes can be measured.

In some embodiments, a physiological sensor in the form of an acoustic physiological sensor may be used to acquire physiological signals from a subject. For example, an acoustic physiological sensor may acquire body sounds or vibrations (for example, vibrations originating from organs such as the heart, lungs, or other organs) from a subject wearing a wearable device.

As mentioned earlier, other examples of physiological sensor can include a muscle activity sensor for acquiring muscle activity signals (such as an electromyography EMG sensor for acquiring electromyography signals) a skin temperature sensor for acquiring skin temperature signals of the subject, and a respiratory rate sensor for acquiring respiratory rate signals of the subject.

A physiological sensor can acquire physiological signals indicative of an emotional state of the subject. For example, an increase in the heart rate, blood pressure, respiration rate, skin temperature, or the like can indicate that the subject is in a negative emotional state (for example, a stressed, uncomfortable or upset emotional state). This can be an indication that the subject may prefer more privacy. Thus, the privacy setting of at least one sensor can be increased to a higher level to provide the subject with more privacy.

In some embodiments, a sensor in the form of a visual sensor (such as a camera, a video, an infra-red sensor, or any other visual sensor or combination of visual sensors) can be used to acquire signals. A visual sensor may be designed to be placed in the environment of the subject (for example, at the home of the subject, at a healthcare facility, or similar). The visual sensor may acquire a visual signal comprising visual content indicative of an emotional state of the subject (such as facial expressions, posture, or similar). The control unit 102 may be configured to recognise predefined facial expressions and postures in visual signals to set an appropriate privacy level for the one or more subjects. Similarly, the control unit 102 may be configured to recognise predefined motion in visual signals specific to an activity to set an appropriate privacy level for the one or more subjects for the activity. The control unit 102 may be configured to recognise an instruction from a subject to set an appropriate privacy level. For example, a subject putting a hand in front of a camera lens can cause the control unit 102 to increase a privacy level.

In some embodiments, a sensor in the form of an acoustic sensor (such as a microphone or any other acoustic sensor) can be used to acquire signals. The control unit 102 may be configured to recognise tones of voice, trigger words, or predefined sounds in acoustic signals to set an appropriate privacy level for the one or more subjects. For example, detecting the sound of a subject crying, a trigger word or change in tone of voice may cause the control unit 102 to change a privacy level. Similarly, the control unit 102 may be configured to recognise sounds specific to an activity to set an appropriate privacy level for the one or more subjects for the activity. The control unit 102 may be configured to recognise a vocal instruction from a subject to set an appropriate privacy level.

In some embodiments, a sensor in the form of an inertial, activity, or motion sensor (such as an accelerometer, a gyroscope, a magnetometer, a visual sensor, a pressure sensor, or any other inertial, activity or motion sensor) can be used to acquire signals. In some embodiments, one or more inertial, activity, or motion sensors may be integrated into a wearable device. In these embodiments, the sensor can acquire signals indicative of any inertial, activity or motion of a subject wearing the wearable device. There may be more than one inertial, activity, or motion sensor, each designed to be worn on different parts of the body of the subject. In some embodiments, an inertial, activity, or motion sensor may be a sensor designed to be placed in the environment of the subject (for example, at the home of the subject, at a healthcare facility, or similar). In these embodiments, the sensor can acquire signals indicative of any inertial, activity or motion in the environment in which the sensor is placed.

A subject may prefer more privacy when performing a certain activity. Thus, when the inertial, activity or motion sensor acquires a signal indicative that the subject is performing (or is preparing to perform) a certain activity, the privacy setting of at least one sensor can be increased to a higher privacy level to provide the subject with more privacy. On the other hand, a subject may need to be monitored when performing a particular activity. Thus, when the inertial, activity or motion sensor acquires a signal indicative that the subject is performing (or is preparing to perform) the particular activity, the privacy setting of the at least one sensor can be decreased to a lower privacy level.

In some embodiments, a sensor in the form of a device activation sensor can be used to acquire signals. For example, a device activation sensor may be designed to be placed on a device for use by a subject (such as a skin cleaning device, a toothbrush, a razor, a shower, or any other device for use by the subject) or in flooring (such as a bathroom floor). The state of the device may be an activated state (i.e. a powered or in use state) or a deactivated state (i.e. an unpowered or unused state). A subject may prefer more privacy when a device is activated. Thus, when the device activation sensor acquires a signal indicative of the state of a device changing from a deactivated state to an activated state, the privacy setting of the at least one sensor can be increased to a higher privacy level to provide the subject with more privacy. On the other hand, a subject may need to be monitored when using a particular device. Thus, when the device activation sensor acquires a signal indicative of the state of this device changing from a deactivated state to an activated state, the privacy setting of at least one sensor can be decreased to a lower privacy level.

In some embodiments, a sensor in the form of a lock activation sensor can be used to acquire signals. A lock activation sensor can acquire signals indicative of the state of a lock. For example, a lock activation sensor may be designed to be placed on a door in the environment of a subject (for example, at the home of the subject, at a healthcare facility, or similar). The state of the lock may be an activated state (i.e. a locked state) or a deactivated state (i.e. an unlocked state). A subject may prefer more privacy when a door is locked. Thus, when the lock activation sensor acquires a signal indicative of the state of a lock changing from an unlocked state to a locked state, the privacy setting of at least one sensor can be increased to a higher privacy level to provide the subject with more privacy.

Although some examples have been provided above for the sensors, their arrangement, and operation, those skilled in the art will be aware of other types of sensor that can be used to acquire signals and for which a privacy setting can be controlled and other arrangements and operations for the sensors. In some embodiments, multiple types of sensor and arrangements of sensors can be used.

Referring again to FIG. 1, in some embodiments, the apparatus 100 may comprise a memory unit 106 configured to store program code that can be executed by the control unit 102 to perform the method described herein. The memory unit 106 can also be used to store information, data, signals and measurements made or acquired by any sensors or devices that are part of the apparatus 100 or that are external to the apparatus 100 (such as acquired sensor signals, characteristics of subjects and associated privacy levels for those characteristics of the subjects and privacy settings).

In some embodiments, the apparatus 100 may comprise at least one user interface component 108. Alternatively or in addition, a user interface component 108 may be external to (i.e. separate to or remote from) the apparatus 100. For example, the user interface component 108 may be part of another device. In the embodiment where a user interface component 108 is external to the apparatus 100, the communications interface component 104 may communicate with the external user interface component wirelessly or via a wired connection.

A user interface component 108 may be for use in providing the one or more subjects or other user of the apparatus 100 (for example, a care giver, a healthcare provider, a health coach, a family member, an emergency contact person, or any other person) with information resulting from the method according to the invention. The control unit 102 may be configured to control one or more user interface components 108 to provide information resulting from the method according to the invention. For example, the control unit 102 may be configured to control one or more user interface components 108 to render the controlled signal to the one or more subjects or other user of the apparatus 100.

Alternatively or in addition, a user interface component 108 may be configured to receive a user input. In other words, a user interface component 108 may allow a subject or another user of the apparatus 100 to manually enter data. The control unit 102 may be configured to acquire a user input from one or more user interface components 108. Examples of user input may be a user input indicative of a required privacy level for a characteristic for a subject, a user input indicative of whether a suggested change in a privacy setting is confirmed or denied, a user input indicative of an instruction to override a privacy setting, a user input indicative of an activity that the subject is to undertake, a user input indicative of an instruction to open or close a shutter on a camera or robotic eye for a current activity, or any other user input or combination of user inputs. Although examples of user input have been provided, it will be understood that the user interface component 108 can be configured to receive other user inputs. Based on a received user input, the privacy requirements of a subject can be learnt. Specifically, the required privacy level of the subject can be determined based on received user input and then stored such that the behaviour of the system can be tuned over time. For example, the user input may compliment or replace decisions that may otherwise be taken automatically by the control unit 102 to set a privacy level. The required privacy level may include a privacy level associated with a certain characteristic (or activity or situation).

A user interface component 108 may be or may comprise any component that enables rendering or output of information, data or signals to the subject or another user of the apparatus 100. Alternatively or in addition, a user interface component 108 may be or may comprise any component that enables the subject or another user of the apparatus 100 to provide a user input, interact with and/or control the apparatus 100. For example, the user interface component 108 may comprise one or more switches, one or more buttons, a keypad, a keyboard, a touch screen or an application (for example on a tablet or smartphone), a display screen or other visual indicator, one or more speakers, one or more microphones, any other voice dialogue components, one or more lights, a component for providing tactile feedback (e.g. a vibration function), or any other user input component or combination of user interface components.

It will be appreciated that FIG. 1 only shows the components required to illustrate this aspect of the invention, and in a practical implementation the apparatus 100 may comprise additional components to those shown. For example, the apparatus 100 may comprise a battery or other power supply for powering the apparatus 100 or means for connecting the apparatus 100 to a mains power supply.

Figure 2:
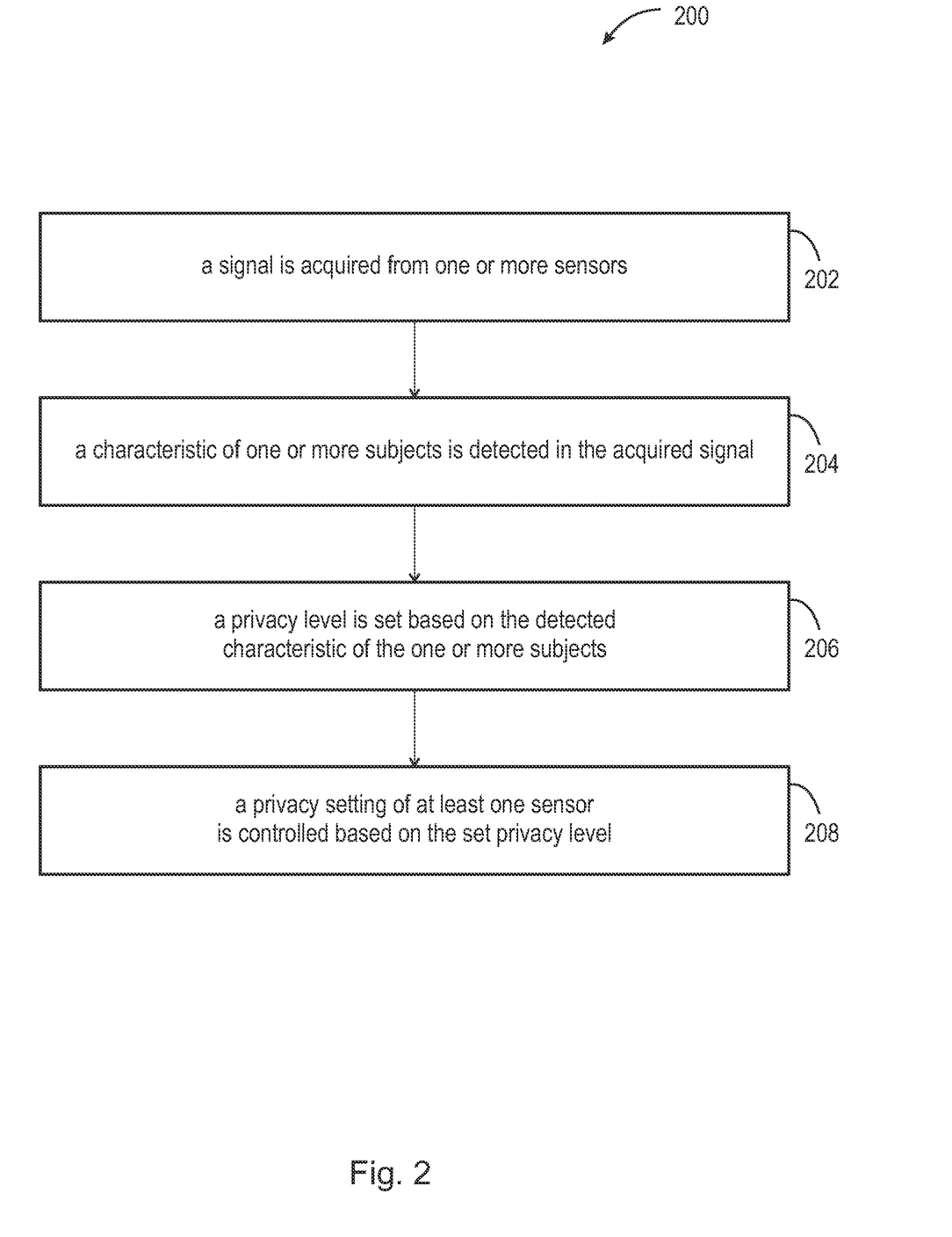
FIG. 2 is a flow chart illustrating a method according to an embodiment.

FIG. 2 illustrates a method 200 for controlling a privacy setting of at least one sensor according to an embodiment. The illustrated method 200 can generally be performed by or under the control of the control unit 102 of the apparatus 100.

With reference to FIG. 2, at block 202, a signal (e.g. an electrical signal) is acquired from one or more sensors. The one or more sensors may be any type of sensor or combination of sensors such as those described earlier.

At block 204, a characteristic of one or more subjects is detected in the acquired signal. The characteristic of the one or more subjects can comprise one or more of: a characteristic indicative of an activity of the one or more subjects (for example, a characteristic indicative of an activity in which the one or more subjects is engaging or is preparing to engage), a characteristic indicative of a level of nakedness of the one or more subjects (for example, detection of certain exposed body parts), a characteristic indicative of an emotion of the one or more subjects, a characteristic indicative of a behaviour of the one or more subjects, a characteristic indicative of a status of a device for use by the one or more subjects, and a physiological characteristic of the one or more subjects. Although examples of the characteristics of the one or more subjects that may be detected in the acquired signal have been provided, it will be appreciated that other characteristics or any combination of characteristics of the one or more subjects may be detected.

At block 206, a privacy level is set based on the detected characteristic of the one or more subjects. In some embodiments, this comprises comparing the detected characteristic with predefined characteristics stored in a database, each predefined characteristic having an associated privacy level. The database may be in the form of a look-up table or list of predefined characteristics and associated privacy levels, which may also be associated with a subject.

The memory unit 106 of the apparatus 100 may comprise the database or the database may be external to (i.e. separate to or remote from) the apparatus 100. In the case of an external database, the communications interface component 104 may communicate with the database wirelessly or via a wired connection to enable the control unit 102 access to the predefined characteristics and associated privacy levels stored in the database.

The predefined characteristic stored in a database may be associated with a privacy level based on previous signals acquired from the one or more sensors and, alternatively or additionally, based on an input received from the one or more subjects. For example, the control unit 102 may be configured to set a privacy level based on a subject's history and based on subject specified preferences or requirements. This can provide a more accurate prediction of the preferred or required settings for the subject.

The predefined characteristic stored in a database may be associated with a privacy level on set-up of the apparatus 100. For example, an assessment may be made of the activity of the subject and the privacy requirements for the subject in the presence of a sensor (and optionally an activity of the subject associated with those privacy requirements) on set-up of the apparatus 100. Alternatively or in addition, the privacy requirements of the subject may be learnt as sensor signals are acquired and processed over time. For example, the control unit 102 may collect data acquired from sensor signals or user input that can indicate a required privacy level for a subject. A required privacy level may be associated with a particular characteristic (or activity or situation). Examples of data may include data acquired through tracking the activity of the subject, data recognised as an emotional response of the subject, data manually provided by the subject via a user interface component 108, or similar.

Subsequent to comparing the detected characteristic with predefined characteristics stored in a database, the predefined characteristic that most closely matches the detected characteristic may be selected. The privacy level is then set to the privacy level associated with the selected predefined characteristic. For example, the database may store signatures or patterns that, when detected in signals acquired from the one or more sensors, indicate with a high degree of likelihood the privacy level that one or more of the subjects will prefer (such as during a certain activity). The control unit 102 can be configured to recognise signatures or patterns in the signals acquired from the one or more sensors and match them to stored signatures or patterns in the database to set an appropriate privacy level. In some embodiments, the database may include a list of privacy settings that are most likely to satisfy the privacy desires of a subject and the privacy level can then be set accordingly. In some embodiments, a required privacy level for a subject can be estimated based on the information available in the database.

In some embodiments, at least one of the one or more subjects may be identified in the acquired signal. For example, a subject may be identified through facial recognition or by detecting the presence of a wearable device of the subject. In these embodiments, a required privacy level for one or more of the at least one identified subjects is determined for the detected characteristic and the privacy level is set based on the determined required privacy level for the one or more of the at least one identified subjects. The required privacy level for the one or more of the at least one identified subjects may be acquired from the database and/or via user input, as described above.

In the case where more than one subject is identified in the acquired signal, at least some of the identified subjects may have a different required privacy level for the detected characteristic. In this example, the required privacy levels of the identified subjects for the detected characteristic are compared to determine which required privacy level is the highest (i.e. which required privacy level will impose the strictest privacy setting). The privacy level is then set to the highest required privacy level. In some embodiments, the privacy level for the at least one identified subject can be set based on the characteristics detected specifically for the at least one identified subject. For example, the subjects identified may be performing different activities and thus different characteristics may be detected for the identified subjects. In these embodiments, the required privacy levels for the detected characteristic for each subject are compared to determine which required privacy level is the highest (i.e. which required privacy level will impose the strictest privacy setting). The privacy level is then set to the highest required privacy level. For example, a first user may be performing a first activity (resulting in detection of a first characteristic) for which a first required privacy level is determined and a second user may be performing a second activity (resulting in detection of a second characteristic) for which a second required privacy level is determined, which is different to the first required privacy level. The first privacy level and the second privacy level are compared and the privacy level is set to the privacy level that is the highest.

In this way, it is possible to set different privacy levels for different subjects. In other words, it is possible to accommodate multi-user settings. This can prove useful in accommodating the varied degree of privacy requirements or preferences between subjects (for example, some subjects may be more comfortable disclosing parts of their body than other subjects).

In some embodiments, the method may further comprise determining the current activity of at least one of the one or more subjects. The determination may be based on an analysis of the characteristics of the one or more subjects detected in the signals acquired from the one or more sensors (such as the activities, levels of nakedness, emotions, behaviour, device activation, physiological characteristics, or similar). For example, the detected characteristics are compared with corresponding characteristics (including signatures or patterns) stored in the database. Based on the comparison, the most likely desired privacy level for the activity is determined. The determined privacy level may also be stored in the database.

The control unit 102 is then configured to set the privacy level based on the comparison for the determined activity. The set privacy level may be maintained until it is detected that the determined activity is over or if it is detected that the emotions of the subject indicated that a different privacy level is desirable. If a current privacy setting in some way limits the signals that need to be acquired for the activity determination, an alternative strategy may be employed to determine the current activity of at least one of the one or more subjects. For example, a limited set of sensors may be used or the at least one of the one or more subjects may be asked for manual input.

In some embodiments, the method may further comprise determining that a privacy sensitive situation is expected to occur based on the detected characteristic of the one or more subjects and, in response to this determination, the privacy level can be set based on the detected characteristic of the one or more subjects. In particular, a more stringent privacy level can be set based on the detected characteristic of the one or more subjects in response to a determination that a privacy sensitive situation is expected to occur. A privacy sensitive situation can be any situation in which one or more subjects will require a more stringent privacy level to be set (such as not recording one or more subjects by at least one sensor, blocking one or more subjects from being recorded by at least one sensor, filtering out one or more subjects from a signal acquired from at least one sensor, or any other increased privacy level). By determining that a privacy sensitive situation is expected to occur based on the detected characteristic of the one or more subjects, future events can be predicted for subjects and an appropriate privacy level can be set for those events in advance of the events occurring. For example, the method may comprise determining a goal, action or intention of at least one of the one or more subjects. In other words, the method may further comprise determining the most likely activity of at least one of the one or more subjects. The determination may be based on an analysis of the characteristics of the one or more subjects detected in the signals acquired from the one or more sensors (such as the activities, levels of nakedness, emotions, behaviour, device activation, physiological characteristics, or similar). For example, the determination may be based on a comparison of signatures or patterns in any of these characteristics stored in the database that, when detected, give an indication of the likelihood that the subject will engage in a certain activity.

In an example embodiment, a detected characteristic of the one or more subjects that can result in a determination that a privacy sensitive situation is expected to occur is a characteristic of a signal acquired from a device activation sensor that is indicative of a device associated with a privacy sensitive situation being activated. In one example, the device associated with the privacy sensitive situation may be a plug or a tap on a bath and the activation of the plug or tap detected by a device activation sensor on the plug or tap can be indicative of the privacy sensitive situation of a subject filling the bath. This situation is privacy sensitive as the subject will undress and thus be naked for the bath. In another example, the device associated with the privacy sensitive situation may be a ventilation unit in a bathroom and the activation of the ventilation unit detected by a device activation sensor connected to the ventilation unit can be indicative of the privacy sensitive situation of a subject taking a shower. This situation is privacy sensitive as the subject will undress and thus be naked for the shower. In another example, the device associated with the privacy sensitive situation may be a wearable device (for example, a smartwatch such as a smartwatch for acquiring health measurements) and the deactivation or removal of the wearable device detected by a device activation sensor can be indicative of the privacy sensitive situation of the subject preparing to take a bath or shower for which they will be naked. The characteristic indicative of the removal of the wearable device can, for example, be detected through a loss of the signal acquired from the wearable device.

In other example embodiments, a detected characteristic of the one or more subjects that can result in a determination that a privacy sensitive situation is expected to occur is a characteristic of a signal acquired from a visual sensor (such as one or more images or a video acquired from a camera) and/or a device usage sensor that is indicative of a privacy sensitive situation. In one example, the control unit may be configured to learn characteristics indicative of movements or activities of a subject that typically precede a privacy sensitive situation in order to detect these characteristics in an acquired signal. For example, the characteristic can be movements associated with a subject undressing, which can indicate that a privacy sensitive situation is expected to occur in that the subject will be naked. The characteristic may also be based on scheduling, such as a time period in which a privacy sensitive situation is expected to occur, and/or can be related to alarm clock settings. In another example, a detected characteristic of the one or more subjects that can result in a determination that a privacy sensitive situation is expected to occur can be indicative of a subject closing blinds, curtains and/or a door in a particular room, such as a bathroom.

In other example embodiments, a detected characteristic of the one or more subjects that can result in a determination that a privacy sensitive situation is expected to occur is a characteristic of a signal acquired from a sleep detection sensor that is indicative of a privacy sensitive situation. For example, the characteristic of the signal acquired from the sleep detection sensor (e.g. in an activity monitor such as a smart watch) that is detected may be indicative of a subject sleeping poorly (such as having a disturbed sleep), which can result in the subject requiring a more stringent privacy level to be set.

In other example embodiments, a detected characteristic of the one or more subjects that can result in a determination that a privacy sensitive situation is expected to occur is a characteristic of a physiological signal acquired from a physiological sensor that is indicative of a privacy sensitive situation. For example, the characteristic of the physiological signal acquired from the physiological sensor (such as a signal acquired from a heart rate sensor, a blood pressure sensor, a galvanic skin response sensor, a heart rate variability sensor, an activity sensor, or similar) that is detected may be indicative of a subject having a low mood, experiencing stress, or not feeling well, which can result in the subject requiring a more stringent privacy level to be set. In another example, the characteristic of the physiological signal acquired from the physiological sensor (such as those mentioned earlier) that is detected may be indicative of there being a change of clothes that are worn by a subject, which may require a more stringent privacy level to be set. For example, the removal of clothes will require a more stringent privacy level to be set and this can be detected in one or more acquired physiological signals since it will cause a change in the body temperature of the subject and thus have an effect on one or more physiological signals.

In other example embodiments, a detected characteristic of the one or more subjects that can result in a determination that a privacy sensitive situation is expected to occur is a characteristic of a signal acquired from an activity sensor that is indicative of a privacy sensitive situation. For example, an activity sensor may monitor the activities of one or more subjects in a house. The characteristic of the signal acquired from the activity sensor that is detected may be indicative of a subject preparing for bed. In one example, the characteristic may be a pattern of activities (such as a subject moving from the living room, to the kitchen, to the bedroom, to the bathroom) that indicate the subject is preparing for bed or may be the subject entering a bathroom in nightwear or a nightgown that indicates that the subject is preparing for bed. In another example, the characteristic may be a recurring pattern of activities associated with a subject, where the pattern has been learnt by the control unit to be indicative of a privacy sensitive situation. For example, a subject may have a fixed morning routine (e.g. during weekdays) such as first making and drinking coffee, then brushing their teeth, and then taking a shower.

In other example embodiments, a detected characteristic of the one or more subjects that can result in a determination that a privacy sensitive situation is expected to occur is a characteristic of a signal acquired from a sensor that is indicative of a privacy sensitive situation related to the removal of clothes. In one example, the control unit may have learnt that a subject entering a bathroom and wearing certain clothes requires a more stringent privacy level to be set. A characteristic indicative of the subject entering the bathroom may be detected in a signal acquired from a sensor of a bathroom door handle and a characteristic indicative of the subject wearing certain clothes may be detected in a signal acquired from a sensor placed in clothing or in a clothing closet. In another example, the characteristic may be a particular movement (such as a movement associated with undressing) detected in a motion signal acquired from a motion sensor (such as a motion sensor of a smartwatch) or detected in a motion signal acquired from a visual sensor (such as a camera) through skeleton recognition and movement detection (for example, a subject moving their arms up to take off a shirt). In another example, the characteristic may be indicative of a subject undressing through clothes detected on the ground or on a radiator.

Although some examples have been provided for the determination that a privacy sensitive situation is expected to occur based on the detected characteristic of the one or more subjects, it will be understood that other examples are also possible. In some embodiments, the method may further comprise determining the most likely emotion of at least one of the one or more subjects. In this embodiment, one or more characteristics indicative of the emotion of the at least one of the one or more subjects are detected and compared with corresponding characteristics (including emotion signatures or patterns) stored in the database. Based on the comparison, the most likely emotion of the at least one of the one or more subjects is determined. The determined emotion may also be stored in the database. In this way, future events can be predicted for subjects and an appropriate privacy level can be set for those events in advance of the events occurring.

Where any new data indicative of a required privacy level for a subject is acquired, the database can be updated to reflect this new data. For example, the control unit 102 may be configured to detect new signatures or patterns in acquired data and may update the database accordingly. This may involve comparing historical data to current data for characteristics and associated privacy levels. Based on this comparison, it is determined whether a pattern is emerging indicating that a subject is likely to have a required privacy level that is not stored in the database. The database is updated to store emerging patterns not previously stored. Examples may include situations where it is determined that a certain activity and privacy setting for a sensor have previously invoked a negative emotion for the subject and it is thus determined that the subject most likely requires a different privacy setting for the sensor during the activity, or where a the subject always manually overrides a set privacy level for a certain activity.

In some embodiments, the set privacy level is rendered by the user interface component 108 to check with the subject whether the set privacy level is confirmed or declined. For example, the user interface component 108 may provide a selectable option to the subject to confirm or decline the set privacy level. In effect, the set privacy level according to these embodiments is a suggested privacy level setting. The suggested privacy level setting may be an increase or decrease in privacy level from a previously set privacy level. For example, an increase in privacy level may be suggested when a characteristic indicative of an increase in the level of nakedness of the one or more subjects (for example, where the one or more subjects have undressed) and, similarly, a decrease in privacy level may be suggested when a characteristic indicative of a decrease in the level of nakedness of the one or more subjects (for example, where the one or more subjects have dressed).

Where a set privacy level is declined by a user input, the privacy level remains unchanged. In other words, the currently set privacy level is maintained. Where a set privacy level is confirmed by a user input, the privacy level is updated to the confirmed privacy level.

At block 208, a privacy setting of at least one sensor is controlled based on the set privacy level. The control unit 102 of the apparatus 100 is configured to control the privacy setting of the at least one sensor based on the set privacy level. The at least one sensor for which a privacy setting is controlled may be any type of sensor or combination of sensors such as those described earlier. The at least one sensor for which a privacy setting is controlled may be at least one of the same sensors as the one or more sensors from which the signal is acquired or at least one different sensor to the one or more sensors from which the signal is acquired. In embodiments where it is determined that a privacy sensitive situation is expected to occur and the privacy level is set in response to this determination, the privacy setting of at least one sensor can also be controlled in response to the determination. In this way, an appropriate privacy setting can be applied in relation to the at least one sensor before the privacy sensitive situation occurs.

In some embodiments, a privacy setting of the at least one sensor may be controlled based on the set privacy level by switching on or off the at least one sensor based on the set privacy level. This form of privacy setting control can be made visible to the one or more subjects through the rendering of a sound, light or display notification. This can reassure the one or more subjects that their privacy requirements are met.

In some embodiments, a privacy setting of the at least one sensor may be controlled based on the set privacy level by moving the at least one sensor with respect to the one or more subjects based on the set privacy level. For example, the control unit 102 of the apparatus 100 may be configured to control a motor of the at least one sensor to visibly turn the at least one sensor (for example, the lens of a camera) away from the subject. This form of privacy setting control is visible to the one or more subjects, which can reassure the one or more subjects that their privacy requirements are met.

In some embodiments, a privacy setting of the at least one sensor may be controlled based on the set privacy level by changing a signal acquisition capability of the at least one sensor based on the set privacy level. For example, the control unit 102 of the apparatus 100 may be configured to change the capabilities of the at least one sensor itself. This may involve, for example, changing the resolution of a camera, adjusting the focus depth of a camera (for example, setting a narrow focus depth such that only a face of a subject is in focus and the rest of the image is blurred), adjusting the number of frequency bands of light gathered in multispectral or hyperspectral imaging sensors (for example, selectively capturing light of a certain spectrum band only to obtain the information of interest while leaving other features unrecognisable), or similar.

In some embodiments, a privacy setting of the at least one sensor may be controlled based on the set privacy level by at least partially blocking, obscuring or altering the signal acquired from the at least one sensor (e.g. by at least partially blocking, obscuring or altering the at least one sensor itself) based on the set privacy level. For example, the control unit 102 of the apparatus 100 may be configured to control a physical privacy setting of the at least one sensor based on the set privacy level. This may involve the control unit 102 controlling one or more actuators to fully or partially block or alter the at least one sensor. The one or more actuators may comprise, for example, a mechanical shutter that can be controlled by the control unit 102 to block the at least one sensor (such as by blocking a lens of a camera). The mechanical shutter may be opaque to visible light or partially transparent, allowing through a specified spectral range (for example, a shutter of a specific colour) or blurring any image acquired using the shutter. Alternatively or in addition, an audio filter may be applied to a microphone to render a voice recording unrecognisable, an image acquired from a camera may be digitally burred, or similar. This form of privacy setting control can visible to the one or more subjects. For example, the one or more subjects will see mechanical shutters in operation or any coloured shutters or filters that are applied to the at least one sensor, or the controlled privacy setting may be rendered to the subject. This can reassure the one or more subjects that their privacy requirements are met.

In some embodiments, a privacy setting of the at least one sensor may be controlled based on the set privacy level by controlling a component (such as a component in surrounding apparatus) to modify the environment of the one or more subjects. In other words, the environment can be controlled or modified such that the set privacy level is met. For example, the component can be controlled to help conceal certain parts of an image. The component may be a lighting component that is controlled to direct light in a set direction.

For example, the control unit 102 may be configured to control a privacy setting of the at least one sensor by switching on an external spotlight. The external spotlight may be directed onto the face of the subject to make the background appear dark and thus privacy compliant. The component may be a lighting component that is controlled to provide dimmed light or to turn off.

In embodiments in which a privacy setting of the at least one sensor is controlled based on an increased privacy level, at least one other sensor may then be used to acquire a signal. In this way, the privacy requirements of a subject can be met whilst less detailed information can still be acquired on the subject (for example, the subject can still be monitored to a lesser extent). For example, a privacy setting of a camera sensor may be controlled based on the set privacy level by switching off the camera and at least one other sensor (such as one or more motion sensors) may then be used to acquire a signal. In this way, the privacy requirements of the subject can be met by switching off the camera, whilst the subject can still be monitored via the at least one other sensor. The privacy setting of the at least one other sensor may also be adapted to meet the set privacy level. For example, where the at least one other sensor is one or more motion sensors, the one or more motion sensors may be controlled based on the set privacy level by limiting the function of the one or more motion sensors to only detect presence of a subject. By only detecting presence of a subject, details on the particular motion or activity of the subject are not acquired and the privacy requirements of the subject can be met.

Although examples have been provided for the way in which the privacy setting of the at least one sensor can be controlled based on the set privacy level, it will be understood that other privacy setting controls are possible and any combination of privacy setting controls can be used. The privacy setting control can be visible to the one or more subjects, as mentioned above.

At any point during the process, an input from at least one of the one or more subjects may be received by one or more of the sensors or via a user interface component 108. The input from at least one of the one or more subjects may be indicative of a required privacy level for the detected characteristic. In this embodiment, it can be determined whether to adjust the set privacy level based on the received input. For example, a user input indicating that a subject has removed a shutter from a lens of a camera can cause the control unit 102 to lower the privacy level. In this way, it is possible for a subject to overrule set privacy levels. When the set privacy level is adjusted based on a received input, the database may be updated accordingly to store the set privacy level as the required privacy level for the subject in the particular situation.

In some embodiments, a change in the characteristic of at least one of the one or more subjects in the acquired signal may be detected. In these embodiments, it can be determined whether to adjust the set privacy level to an alternative privacy level based on the detected change in the characteristic of the at least one of the one or more subjects. The alternative privacy level may be a pre-set privacy level.

Optionally, subsequent to controlling a privacy setting of the at least one sensor based on the set privacy level (at block 208), a controlled signal is acquired from the at least one sensor with the controlled privacy setting. For example, the controlled privacy setting may be a hyper-spectral camera acquiring an image at a specific wavelength while other wavelengths are blocked, or a visible light camera acquiring an image of a certain part of the body of a subject that is selectively enlightened by a light component while the rest of the subject is kept dark and thus unrecognisable, or a visible light camera only acquiring an image of the face of a subject to enable relevant guidance and feedback on a specific activity (such as grooming or skin care activity) and blocking the background image around the face to avoid capturing of other subjects passing by, or any other controlled privacy setting.

The controlled signal may then be rendered to the one or more subjects. For example, the control unit 102 may control a user interface component 108 to render the controlled signal. In one example, a user interface component 108 may render a controlled signal on a screen by displaying an acquired image from a camera controlled with the privacy setting. Other examples may include rendering a blurred acquire camera image on a screen or rendering an acquired waveform on a screen following disconnection of a microphone to show the difference between the microphone being connected and disconnected. In this way, a feedback loop that renders the signals acquired from the at least one sensor under the controlled privacy setting. This can reassure the one or more subjects that their privacy requirements are met.

Figure 3:
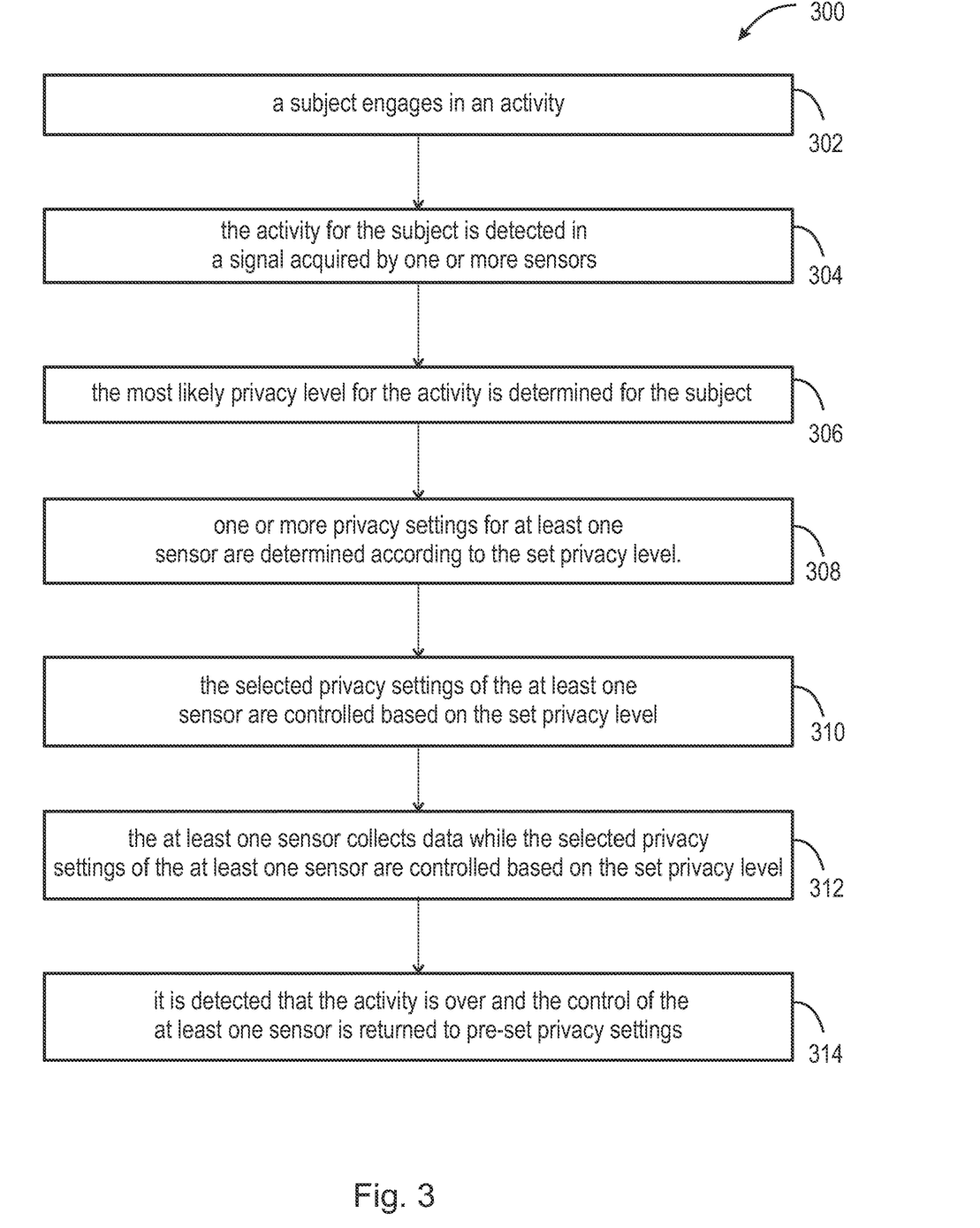
FIG. 3 is a flow chart illustrating a method according to an exemplary embodiment.

FIG. 3 illustrates a method 300 for controlling a privacy setting of at least one sensor according to an exemplary embodiment.

At block 302, a subject engages in an activity. The activity may require the privacy settings of at least one sensor to be adapted in order to meet the privacy requirements of the subject for the activity. The at least one sensor may currently be controlled using a pre-set privacy setting. At block 304, the activity for the subject is detected in a signal acquired by one or more sensors.

At block 306, the most likely privacy level for the activity is determined for the subject. In other words, the privacy level that the subject most likely prefers for the activity is determined. The required privacy level may be determined by looking up the subject and activity in a database, analysing previously acquired data for the subject in the database, or requesting user input of the required privacy level. The privacy level is then set to the determined required privacy level.

At block 308, one or more privacy settings for at least one sensor are determined according to the set privacy level. In other words, one or more privacy settings are selected for at least one sensor that meet the set privacy level. At block 310, the selected privacy settings of the at least one sensor are controlled based on the set privacy level.

At block 312, the at least one sensor collects data while the selected privacy settings of the at least one sensor are controlled based on the set privacy level. At block 314, it is detected that the activity is over and the control of the at least one sensor is returned to pre-set privacy settings.

In an exemplary embodiment of the apparatus 100 in use, a subject uses a skin analysis device on naked skin. The activity is detected due to the device activation. During the activity, the subject indicates a preference for an increased privacy level and thus a privacy setting of the camera is changed by covering the lens of the camera with a mechanical shutter. The subject thus feels more comfortable performing the skin analysis with the device.

In another exemplary embodiment of the apparatus 100 in use, a first subject and a second subject are using a bathroom. The first subject is shaving his face using a bathroom mirror and there is a camera active to support this activity. However, the second subject comes into the bathroom naked to take a shower. The presence of the second subject is detected and the camera settings are adjusted to allow more privacy. For example, the camera may be controlled to move away from the area where the second subject takes a shower or the focal setting of the camera may be changed to focus only the face of the first subject.

In another exemplary embodiment of the apparatus 100 in use, new privacy settings are taught. A first subject interacts with an intelligent bathroom mirror having an embedded camera (for example, the first subject may use the mirror to check toothbrush results). A second subject undresses next to the first subject in preparation for taking a shower. The first subject paces a hand in front of the camera and the system learns this preference of the first subject and updates the privacy settings.

In another exemplary embodiment of the apparatus 100 in use, a focussed psoriasis skin analysis is performed. A subject provides a user input that indicates a self test of skin psoriasis is to be performed (for example, to check the progress of the disease). The self-test involves analysis with a camera on the chest area of the subject. The privacy settings of the camera are adjusted to a hyperspectral setting. The lens of the camera is covered with a colour filter and is configured to zoom into the area where the skin psoriasis is located. For example, the field of view of the camera is reduced to a few centimetres. The image acquired by the camera is rendered to the subject on a bathroom mirror screen such that the subject is reassured that privacy is guaranteed.

In another exemplary embodiment of the apparatus 100 in use, a locked door signals that total privacy is required by a particular subject. The subject enters a bathroom and is concerned about privacy. When the subject activates the door lock and the identity of the subject is detected, the camera and microphone is disabled. Automatically, a shutter is configured to cover the camera and the microphone is disabled by a visual disconnection. When the door is unlocked, the camera and microphone are enabled again. Alternatively, the recordings from the camera and the microphone are masked such that identification of the subject through the recordings is not possible. The masked recordings may also be rendered on a display to reassure the subject of their privacy.

In another exemplary embodiment of the apparatus 100 in use, multiple personalised privacy levels are set for different subjects. Each subject can specify a privacy level personal to themselves and it is ensured that these privacy levels are not violated in a multi-user setting (i.e. when more than one subject is present in the same environment). For example, a first subject specifies a privacy level that indicates that no level of nudity is allowed and that their face visible is allowed. A second subject specifies that nudity is allowed provided that their head is not visible and that their eyes are always blocked. If the first subject is performing an action on their face in front of a camera and the second subject passes by nude in the background without their head visible to the camera, the camera will continue to record at the same privacy setting. If the second subject is performing an action on their face, then the eyes of the second subject are blocked. If the first subject comes into view nude, the camera lens closes or the camera is configured to make no recording of the background. The recording may be rendered on a display.

There is therefore provided an improved method and apparatus for controlling a privacy setting of at least one sensor. The method and apparatus can be useful in systems that monitor a subject at home (such as in a telehealth system, a personal emergency response system or other home monitoring system), in systems that monitor a subject at a healthcare facility (such as a hospital, an ambulance, or other healthcare facility) and in a personal robot.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. A method of operating an apparatus comprising a control unit to control a privacy setting of a camera and/or microphone, the method comprising:
    acquiring, by the control unit, a signal from one or more sensors, wherein the one or more sensors includes at least the camera and/or microphone;
    detecting, by the control unit, a characteristic of one or more subjects in the acquired signal, wherein the characteristic is indicative of an activity in which the one or more subjects is engaging or is preparing to engage;
    determining, by the control unit, that a privacy sensitive situation is expected to occur based on the detected characteristic of the one or more subjects; and
    in response to the determination:
        setting, by the control unit, a privacy level based on the detected characteristic of the one or more subjects;
        controlling, by the control unit, a privacy setting of the camera and/or microphone based on the set privacy level such that information collected by the camera and/or microphone is limited compared to a non-privacy sensitive situation; and
        acquiring, by the control unit, a controlled signal from the camera and/or microphone with the controlled privacy setting.

2. The method as claimed in claim 1, wherein setting a privacy level based on the detected characteristic of the one or more subjects comprises:
    comparing, by the control unit, the detected characteristic with predefined characteristics stored in a database, each predefined characteristic having an associated privacy level;
    selecting, by the control unit, the predefined characteristic that most closely matches the detected characteristic; and
    setting, by the control unit, the privacy level to the privacy level associated with the selected predefined characteristic.

3. The method as claimed in claim 2, wherein a privacy level stored in the database is associated with a predefined characteristic based on one or more of:
    previous signals acquired from the one or more sensors and an input received from the one or more subjects.

4. The method as claimed in claim 1, further comprising:
    identifying, by the control unit, at least one of the one or more subjects in the acquired signal; and determining, by the control unit, a required privacy level for one or more of the at least one identified subjects for the detected characteristic;

wherein setting the privacy level based on the detected characteristic of the one or more subjects comprises:
setting, by the control unit, the privacy level based on the determined required privacy level for the one or more of the at least one identified subjects.

5. The method as claimed in claim 1, further comprising:
receiving, by the control unit from one or more user interface components, an input from at least one of the one or more subjects indicative of a required privacy level for the detected characteristic; and
determining, by the control unit, whether to adjust the set privacy level based on the received input.

6. The method as claimed in claim 1, further comprising:
detecting, by the control unit, a change in the characteristic of at least one of the one or more subjects in the acquired signal; and
determining, by the control unit, whether to adjust the set privacy level to an alternative privacy level based on the detected change in the characteristic of the at least one of the one or more subjects.

7. The method as claimed in claim 1, wherein the characteristic of the one or more subjects further comprises one or more of:
a characteristic indicative of a level of nakedness of the one or more subjects; and
a characteristic indicative of an emotion of the one or more subjects.

8. The method as claimed in claim 1, wherein controlling a privacy setting of the camera and/or microphone based on the set privacy level comprises one or more of:
switching on or off the camera and/or microphone based on the set privacy level;
moving the camera and/or microphone with respect to the one or more subjects based on the set privacy level;
changing a signal acquisition capability of the camera and/or microphone based on the set privacy level;
at least partially blocking, obscuring or altering the camera and/or microphone based on the set privacy level; and
controlling a component to modify the environment of the one or more subjects.

9. The method as claimed in claim 1, further comprising:
controlling, by the control unit, one or more user interface components to render the controlled signal to the one or more subjects.

10. A computer program product comprising a non-transitory computer readable medium, the non-transitory computer readable medium having computer readable code embodied therein, the computer readable code being configured such that, on execution by a computer or processor, the computer or processor is caused to perform the method of claim 1.

11. An apparatus for controlling a privacy setting of a camera and/or microphone, the apparatus comprising:
a control unit configured to:
acquire a first signal from one or more sensors, wherein the one or more sensors includes at least the camera and/or microphone and at least one other sensor;
detect a characteristic of one or more subjects in the acquired first signal, wherein the characteristic is indicative of an activity in which the one or more subjects is engaging or is preparing to engage;

determine that a privacy sensitive situation is expected to occur based on the detected characteristic of the one or more subjects; and
in response to the determination:
set a privacy level based on the detected characteristic of the one or more subjects;
control a privacy setting of the camera and/or microphone based on the set privacy level, wherein the camera and/or microphone are switched on or off based on the set privacy level such that information collected by the camera and/or microphone is limited compared to a non-privacy sensitive situation; and
acquire a second signal from the at least one other sensor of the one or more sensors, wherein the at least one other sensor does not include the camera and/or microphone.

12. The apparatus as claimed in claim 11, wherein the control unit is configured to control one or more user interface components to render the controlled signal.

13. The apparatus as claimed in claim 11, the apparatus comprising at least one of the one or more of the sensors.

14. The apparatus as claimed in claim 11, wherein the one or more sensors comprises one or more of:
a visual sensor;
an acoustic sensor;
a physiological sensor;
an inertial sensor;
a motion sensor;
a device activation sensor; and
a lock activation sensor.

15. A method of operating an apparatus comprising a control unit to control a privacy setting of a camera and/or microphone, the method comprising:
acquiring, by the control unit, a signal from one or more sensors, wherein the one or more sensors includes at least the camera and/or microphone;
detecting, by the control unit, a characteristic of one or more subjects in the acquired signal;
determining, by the control unit, that a privacy sensitive situation is expected to occur based on the detected characteristic of the one or more subjects; and
in response to the determination:
setting, by the control unit, a privacy level based on the detected characteristic of the one or more subjects;
controlling, by the control unit, a privacy setting of the one or more sensors based on the set privacy level, wherein a component is controlled to modify the environment of the one or more subjects such that information collected by the camera and/or microphone is limited compared to a non-privacy sensitive situation.

16. The method as claimed in claim 15, further comprising:
identifying, by the control unit, at least one of the one or more subjects in the acquired signal; and
determining, by the control unit, a required privacy level for the at least one identified subject based on the detected characteristic;
wherein setting the privacy level based on the detected characteristic of the one or more subjects comprises:
setting, by the control unit, the privacy level based on the determined required privacy level for the at least one identified subject.

17. The method as claimed in claim 15, further comprising:

acquiring, by the control unit, a controlled signal from the camera and/or microphone with the controlled privacy setting.

18. The method as claimed in claim 15, further comprising:

acquiring, by the control unit, a signal from at least one other sensor of the one or more sensors after controlling the privacy setting of the one or more sensors, wherein the at least one other sensor does not include the camera and/or microphone.

19. The method as claimed in claim 18, wherein the at least one other sensor of the one or more sensors comprises one or more of:

a visual sensor;
an acoustic sensor;
a physiological sensor;
an inertial sensor;
a motion sensor;
a device activation sensor; and
a lock activation sensor.

20. The method as claimed in claim 15, wherein the characteristic of the one or more subjects comprises one or more of:

a characteristic indicative of an activity in which the one or more subjects is engaging or is preparing to engage;
a characteristic indicative of a level of nakedness of the one or more subjects;
a characteristic indicative of an emotion of the one or more subjects;
a characteristic indicative of a behaviour of the one or more subjects;
a characteristic indicative of a status of a device for use by the one or more subjects; and
a physiological characteristic of the one or more subjects.

* * * * *